3,842,134
POLYMERIZATION PROCESS
Robert E. Pratt, Costa Mesa, Calif., assignor to Bray Oil Company, Los Angeles, Calif.
No Drawing. Filed June 9, 1972, Ser. No. 261,514
Int. Cl. C07c 3/18
U.S. Cl. 260—683.15 B                       7 Claims

ABSTRACT OF THE DISCLOSURE

Oils of intermediate viscosity especially suitable for hydraulic fluids and light lubricants, characterized by high viscosity index above about 120 and low pour point, below −65° F. are made by the polymerization of normal alpha olefines of 6 to 10 carbon atoms using a unique catalyst, a complex of $AlCl_3$ and a nitroalkane which controls the polymerization and directs it toward the formation of oils in the desired molecular weight range. These oils are then recovered from the mixed polymer by fractional distillation.

---

This invention relates to the manufacture of hydrocarbon lubricating oils, hydraulic oils, and functional fluids by polymerization of olefines. More particularly, it relates to oils of a medium viscosity characterized by high viscosity index, high flash point, and low pour point. Specifications for one such oil are set forth in U.S. Air Force Specification MIL-H-83282 which is as follows:

Viscosity, centistokes, at 100° F. (minimum) ____ 16.5
Viscosity, centistokes, at 210° F. (minimum) ____ 3.5
Viscosity, centistokes, at −40° F. (maximum) ___ 2800
Pour point, ° F. (maximum) _____ −65
Flash point, °F. (minimum) _____ 400

Oils meeting this specification will have a viscosity index of 120 and above.

It has long been known that oils of high viscosity index and low pour point can be made by polymerization of olefines having a straight chain or "normal" structure, preferably with the unsaturated bond at the end of the chain, the so-called "alpha olefines." Early work in this field is described in U.S. Pats. 2,091,398 and 2,091,399 where the normal olefine monomer was prepared by cracking paraffin wax and polymerizing the resulting unsaturated naphtha with aluminum chloride catalyst. Later, alpha olefines were obtained by the Fischer-Tropsch process (U.S. 2,500,163) and selective polymerization of ethylene (U.S. 3,549,723 and U.S. 3,647,912). Currently, alpha straight chain olefines are being produced by polymerization of ethylene.

The catalyst used in the polymerization of alpha olefines has usually been anhydrous aluminum chloride in the amount of about 1 to 5% by weight of the olefine. The reaction with $AlCl_3$ catalyst is very rapid, highly exothermic, and sometimes violent, usually being complete within a few minutes. Various solvents were commonly used to aid control of the reaction, chlorinated hydrocarbons, cyclo-hexane and saturated petroleum naphtha, free of aromatics, being typical. Catalyst sludge settles and is withdrawn and the oil, after washing and neutralizing, is fractionated to obtain the desired lubricating oil which may be hydrogenated to eliminate residual unsaturation and improve stability. Oil made in this way has a relatively high viscosity, for example, 30 to 100 centistokes at 100° F. (see U.S. Pat. 3,156,736). Such oils have limited application because of their relatively high viscosity and it has been the practice to blend them with light distillate oils from petroleum as described in U.S. Pat. 2,360,446. However, when this is done, there is usually a serious loss in viscosity index and flash point. If these heavy oils are carefully fractionated in vacuum, they yield only a small amount of product in the low and intermediate viscosity range desired for hydraulic oils. Accordingly, it has not been economical to make hydraulic oils by this method heretofore.

Many attempts to solve this problems have been made by use of different catalysts, other than anhydrous $AlCl_3$. Ziegler type catalysts, such as the aluminum alkyls alone or in combination with transition metal halides, have shown some promise. Antonsen et al. (I.&E.C.—vol. 2, pp. 224-28, September 1963) found that propylene oxide was a valuable addition agent for this type of catalyst. However, these catalysts can produce "polycrystalline" solids which are of little value in lubrication owing to high pour points (D. J. Buckley—Esso Res. & Eng. Cyclopedia of Polymer Technology, vol. 9, pp. 440-449, Interscience Publishing Company).

Aluminum chlor alkyls, e.g., $Al(C_2H_5)_2Cl$, have also been used, alone or in combination with transition metal halides. Use of catalysts of this type requires rigid control of conditions, inert gas atmosphere, exclusion of moisture, and extensive reaction time.

Following are publications and patents relating to these "Ziegler" catalysts for olefine polymerization: U.S. Pats.: 2,907,805; 2,935,542; 2,965,691; 2,993,942; 3,108,145; 3,113,167; 3,156,736; 3,179,711; 3,206,523; 3,253,052; 3,259,667; 3,259,668; 3,346,662; 3,403,197; 3,457,322. Others: French Pat. 1,263,806, dated May 8, 1961; British Pat. 809,717, dated Mar. 4, 1959; British Pat. 873,067, dated July 19, 1961; Duling et al., American Society of Lubrication Engineers, Trans., vol. 9, Jan. 12, 1966.

Boron trifluoride and phosphoric acid were used in U.S. 2,816,944. Lead acetate was used in U.S. 2,500,161.

An object of my invention is to provide a process of polymerizing normal olefins to lubricating oils wherein at least thirty percent of the polymer oil lies within the low viscosity range of 15 to 20 centristokes at 100° F., and 3 to 5 centistokes at 210° F., typical of aircraft hydraulic fluids for many years and meeting the specification MIL-H-83282 hereinabove described. Another object of my invention is to prepare an olefine polymer oil with a pour point below minus 60° F. Another object of my invention is to prepare a olefine polymer oil with a high flash point above 400° F. boiling within the range of about 300–520° F. at 0.5 mm. mercury pressure.

Still another object of my invention is to prepare an olefine polymer oil of high heat and oxidation stability which is completely saturated, suited for use in jet aircraft, either as a hydraulic fluid or as a lubricant.

I have now discovered that oils meeting the foregoing requirements can be made by employing, as starting material, normal olefines of 6 to 12 carbon atoms, preferably 8 and 10 carbon atoms, alone or in admixture with one another and effecting polymerization by contacting with a catalyst comprised of anhydrous aluminum chloride modified with a nitro paraffin, preferably mononitro methane. I prefer to also include titanium tetrachloride —$TiCl_4$— in the catalyst. The nitro methane is effective in a ratio of from 1 to 6 mols per mol of $AlCl_3$. Mononitro ethane and mononitro propane can also be used.

Typical catalyst formulations—molar proportions—are as follows:

| $AlCl_3$ | $TiCl_4$ | $CH_3NO_2$ |
|---|---|---|
| 1 | 1 | 3 |
| 2 | 3 | 3 |
| 2 | 1 | 4 |
| 1 | 0 | 3 |

I have also discovered that dibutyl tin dichloride or tributyl tin chloride can be used to replace titanium chloride in the above formulations, using in general, one mol per mol of $AlCl_3$.

The effect of these modifications of the aluminum chloride catalyst is to control the reaction and direct the polymerization toward polymers having a high viscosity index—i.e. a low viscosity-temperature coefficient—and at the same time terminating a substantial percentage of the molecules within the range of the desired trimers (in the case of decene monomer) and tetramers (in the case of octene monomer). Many attempts have been made to effect such polymer termination but, generally, with the result that the product oil possesses an inferior viscosity index. Thus, according to U.S. Pat. 2,698,324, phenothiazine was used to modify the action of aluminum chloride. Six hours heating at 150° F. was required to produce a yield of 47% of polymer oil with a viscosity index of 88.4, and a viscosity of 684 SSU at 100° F. Similarly, U.S. Pat. 2,500,163 describes polymerizing normal olefines with a phosphorous sulfide catalyst giving yields below 50% of an oil containing up to 12% sulfur and having a viscosity index below 100. In one example, a light fraction with a viscosity index of 133 was obtained, but only with a yield of 3.6%. Temperatures of 600–750° F. were required.

Essentially the same procedure was followed throughout the experiments reported hereinafter. The aluminum chloride-nitro methane complex was prepared by mixing anhydrous $AlCl_3$ with nitro methane in the desired ratio at ordinary room temperature, the powdered $AlCl_3$ rapidly dissolving in the nitro alkane with some evolution of heat. To obtain a catalyst ratio of 1 mol $AlCl_3$ to 3 mols $CH_3NO_2$, I use 133 parts of $AlCl_3$ to 183 parts of $CH_3NO_2$ by weight. In the examples which follow, the composition is indicated in mols.

The catalyst is added to the olefine monomer in a glass container sometimes open to the atmosphere but usually under dry nitrogen. A cooling bath or heating mantle surrounds the container to control the temperature as desired. A magnetically driven stirring device supplies agitation.

After the reaction is complete, usually indicated by a falling temperature, 5% ammonium chloride solution is added with thorough mixing to hydrolyze and remove catalyst, usually while at about 160–170° F. The aqueous layer was discarded and the oil washed twice with water containing ammonium hydroxide, then twice with water acidified with HCl, then 3 times with distilled water. The oil was then dried over anhydrous sodium sulfate or simply by heating to evaporate unreacted monomer, the escaping vapors of the olefine effectively removing all water. If desired, the bulk of the catalyst can be separated from the reacted mixture by settling before adding a hydrolyzing or neutralizing agent to the product.

After testing the oil from which monomer has been removed by evaporation, it was then separated into fractions, usually four, by vacuum distillation at a pressure—absolute—of about 0.3 to 1.0 mm. mercury. Yield and viscosity were determined on the fractions. Pour point and flash point also were determined in some cases.

EXAMPLE 1

This experiment illustrates the result of polymerization with aluminum chloride, unmodified as in the prior art. To 500 gm. 1-decene was added 7.5 gm. $AlCl_3$ with stirring. The reaction suddenly became violent and, within 85 seconds, the temperature went to 320° F. Stirring was continued 15 minutes and, after washing the product, 480 gm. yield was obtained. Unreacted monomer was removed at 150° F. and 0.33 mm. pressure.

Viscosity at 100° F. _____ cs__ 84.55
Viscosity at 210° F. _____ cs__ 12.10
Viscosity index _____ 148

Distillation of the above product gave the following results:

| Fraction | Range, °F. | Mm. Hg | Yield Gms. | Yield Percent | Viscosity, cs. 100° | Viscosity, cs. 210° | V.I. |
|---|---|---|---|---|---|---|---|
| Dimer | 150–360 | 0.3 | 7.8 | 4.4 | 5.07 | 1.72 | |
| Trimer | 360–470 | 0.9 | 12.0 | 6.8 | 16.26 | 3.68 | 124 |
| Tetramer | 470–530 | 1.4 | 28.5 | 16.1 | 28.58 | 5.44 | 141 |
| Residue | | | 128.9 | 72.7 | 158.54 | 18.64 | 141 |

Note the low yield of trimmer—6.8%—and high yield of high viscosity oil (residue). Distillation was terminated at 530° because of decomposition.

EXAMPLE 2

To 370 gm. 1-decene was added 3 cc. $CCl_4$ promoter and 18.5 gm. (5%) anhydrous $AlCl_3$. After a slow start at 70° F., the temperature suddenly went to 300° F., the reaction becoming violent at 120° F. in spite of cooling the outside of the reactor with ice water. It was mixed 40 minutes at 40° F. The reaction mixture was diluted with 200 cc. benzene, then the catalyst was removed by washing with water and neutralizing with NaOH. Solvent was expelled at 440° F., giving a yield of yellow oil—330 gm.=90%.

Gravity, API _____ 36.5
Viscosity, cs. at 100° _____ 54.62
Viscosity, cs. at 210° _____ 8.55
Viscosity index _____ 143
Pour point, —75° F.

EXAMPLE 3

To 500 gm. 1-decene was added 15 gm.

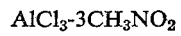

$AlCl_3 \cdot 3CH_3NO_2$ at 180° F. Temperature was controlled easily between 180–200° F. for 1½ hours. After removal of catalyst, washing and drying, the oil was stripped free of monomer and vacuum distilled with the following results:

| Fraction | Range, °F. | Mm. Hg | Yield Gms. | Yield Percent | Viscosity, cs. 100° | Viscosity, cs. 210° | V.I. |
|---|---|---|---|---|---|---|---|
| Dimer | 150–360 | 0.1 | 34.0 | 15.3 | 5.48 | 1.75 | |
| Trimer | 360–470 | 0.15 | 62.9 | 28.2 | 18.31 | 3.96 | 124 |
| Tetramer | 470–510 | 0.25 | 55.4 | 24.9 | 35.49 | 6.12 | 132 |
| Residue | | | 70.6 | 31.7 | 102.33 | 13.14 | 136 |

The oil, before fractionation, tested as follows:
Viscosity at 100° _____ cs__ 30.85
Viscosity at 210° _____ cs__ 5.71
Viscosity index _____ 140

From the above data, it will be seen that the control of the polymerization with nitro methane resulted in an increase in combined yield of trimer and tetramer from 22.9% (Example 1) to 53.1% with only slightly lower viscosity index.

EXAMPLE 4

In this experiment, the $AlCl_3$-$CH_3NO_2$ complex catalyst was further modified with titanium tetrachloride. To 300 gm. 1-decene was added 5 gm. $TiCl_4$ and 12 gm. $AlCl_3 \cdot 3CH_3NO_2$. Mixing was continued at 140–150° F.

for 4 hours with little apparent reaction. It was then heated to 200° F. whereupon reaction occurred as shown by exothermic temperature rise. Cooling held the temperature between 200 and 220° F. for ten minutes. Then was added 2 gm. more $AlCl_3$-$3CH_3NO_2$ complex to insure completion of the reaction, followed by heating to 220° F. The product was washed free of catalyst, dried and decolorized by filtration through filter clay (Filtrol—Grade 13).

After removal of a small amount of monomer by vacuum distillation, the oil tested as follows:

Viscosity at 100° _____cs__ 23.84
Viscosity at 210° _____cs__ 4.84
Viscosity index _____ 139

Vacuum distillation of 220 grams of the oil gave the following results:

| Fraction | Range, °F. | Mm. Hg | Yield | | Viscosity, cs. | | V.I. |
|---|---|---|---|---|---|---|---|
| | | | Gms. | Percent | 100° | 210° | |
| Dimer | 230-375 | 0.9 | 38 | 17.2 | | | |
| Trimer | 375-465 | 0.9 | 85 | 38.6 | 18.83 | 4.03 | 124.5 |
| Tetramer | 465-540 | 0.9 | 40 | 18.2 | 37.38 | 6.74 | 150.5 |
| Residue | | | 57 | 25.9 | 86.77 | 11.74 | 138.0 |

Viscosity of trimer at —40° F.—2608 cs.

Comparing the results of Example 3 and Example 4, it is apparent that the titanium tetrachloride has shifted the molecular weight of the polymers toward the lower range. The residue yield was reduced 5.8% and the yield of the desired trimer increased about 10%.

EXAMPLE 5

The effect of temperature control and reaction rate is shown by the following data using the same catalyst as in Example 4, but a slightly less amount. The reaction was allowed to proceed *without cooling*. To 300 gm. 1-decene was added 3.0 gm. $TiCl_4$ and 8 gm. $AlCl_3$-$3CH_3NO_2$. The reaction became exothermic when heated to 200° F., the temperature then rising rapidly to 360° F. After removal of monomer, the oil tested as follows:

Viscosity cs. at 100° F. _____ 22.15
Viscosity cs. at 210° F. _____ 4.57
Viscosity index _____ 134

Vacuum distillation of 158.5 gm. gave the following results:

| Fraction | Range, °F. | Mm. Hg | Yield, percent | Viscosity, cs. | | V.I. |
|---|---|---|---|---|---|---|
| | | | | 100° | 210° | |
| Dimer | 130-312 | 0.3 | 22.1 | 5.07 | 1.67 | 98 |
| Trimer | 312-465 | 0.4 | 35.3 | 18.07 | 3.82 | 113 |
| Tetramer | 465-530 | 0.4 | 20.2 | 41.84 | 6.99 | 138 |
| Residue | | | 22.4 | 106.55 | 12.46 | 119 |

Viscosity of the trimer at —40° F.—2890 cs.

These results show the importance of controlling the reaction to obtain the desired trimer fraction with high viscosity index. It will be noted that the V.I. of all fractions is lower than in Example 4 when the temperature was held below 220° F. The most desirable range of temperature with my catalyst appears to be 180 to 250° F.

EXAMPLE 6

In this experiment, 400 gm. 1-decene was charged with 6.5 gm. $TiCl_4$ and 12 gm.  $AlCl_3$-$3CH_3NO_2$. The reaction was controlled between 180 and 220° F. Total product oil after washing and clay treating gave viscosities of 28.94 cs. at 100° and 5.69 cs. at 210°, V.I.—141.5.

Combined weight of the trimer and tetramer fractions obtained on vacuum distillation was 54.6%. The trimer had a pour point of below —80° F. while the pour point of the tetramer was —70° F. The trimer viscosity was 2521 cs. at —40° F., and V.I. 121.5.

EXAMPLE 7

Combining a lower molecular weight olefine with decene produces a co-polymer oil having a lower pour point. This is shown by the following experiment:

To 300 gm. 1-decene was added 100 gm. 1-octene and a catalyst comprising 6.5 gm. $TiCl_4$ and 12 gm.

$AlCl_3$-$3CH_3NO_2$.

Reaction was held between 170 and 200° F. for 1½ hours. After removal of catalyst and light hydrocarbons, the product oil tested:

Viscosity at 100° F. _____cs__ 27.42
Viscosity at 210° F. _____cs__ 5.29
Viscosity index (calculated) _____ 140.1

Vacuum distillation of this oil gave the following results:

| Fraction | Range, °F. | Mm. Hg | Yield, percent | Viscosity, cs. | | V.I. |
|---|---|---|---|---|---|---|
| | | | | 100° | 210° | |
| Dimer | 120-360 | 0.4 | 15.3 | 5.60 | 1.83 | |
| Trimer | 360-470 | 0.35 | 37.6 | 18.94 | 4.00 | 120 |
| Tetramer | 470-540 | 0.55 | 26.6 | 39.75 | 6.64 | 133 |
| Residue | | | 20.5 | 116.7 | 14.24 | 136 |

Viscosity of trimer at —40° F.: 2,713.4 cs.
Pour point, trimer: $<-80°$ F.
Pour point, tetamer: —80° F.

EXAMPLE 8

Polymerization of octene alone was found to give oils of lower viscosity index throughout the range of boiling points, i.e., molecular weight. The total product viscosity index was 127 and the trimer and tetramer fractions had 210° viscosities of 4.73 and 7.57 cs. respectively and the same viscosity index, i.e. 110.

EXAMPLE 9

A mixture of 1-hexene, 1-decene and 1-dodecene in equal parts by weight, when polymerized with $TiCl_4$-$AlCl_3$-$3CH_3NO_2$ gave an oil with the following viscosities:

Viscosity at 100° F. _____cs__ 25.25
Viscosity at 210° F. _____cs__ 4.96
Viscosity index _____ 135

EXAMPLE 10

When substituting tin butyl chloride in the catalyst for the nitro methane, the product oil was more viscous with a lower yield of oil in the desired trimer range, viz:

To 200 gm. 1-decene was added 3 gm. $TiCl_4$, 3 gm. 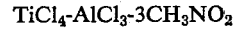 $SnCl_2(C_4H_9)_2AlCl_3$. The reaction was rapid, being complete within five minutes. The total product, stripped of light hydrocarbons tested:

Viscosity at 100° F. _____cs__ 24.65
Viscosity at 210° F. _____cs__ 5.20
Viscosity index _____ 160.5

The yield of trimer boiling at 350-450° F. (0.2 mm.) was only 23.7% with a viscosity of 3.62 and 16.12 cs.

at 210° and 100° respectively and a viscosity index of 119. The viscosity index of the heavy fractions was much higher, viz: 134.5 and 147. Clearly, this catalyst directs the polymerization toward the higher molecular weight oils.

EXAMPLE 11

Addition of a higher alcohol in the range of $C_8$ to $C_{12}$ to the catalyst has the effect of reducing the amount of the heavy residue polymers, probably by terminating chains at the higher levels. The effective amount of the higher alcohol lies in the range of about 0.25 mol to 1 mol per mol of $AlCl_3$. This is shown in the following:

To 300 gm. 1-decene was added 5 gm. $TiCl_4$, 12 gm. $AlCl_3$-$3CH_3NO_2$ and 3 gm. isodecanol. Polymerization was terminated after 1½ hours at 160–180° F., giving 80% yield of polymer oil testing as follows:

Viscosity at 100° F. _____ cs__ 21.14
Viscosity at 210° F. _____ cs__ 4.44
Viscosity index _____ 134

Vacuum distillation gave the following results:

| Fraction | Range, °F. | Yield, percent | Viscosity 100° | 210° | V.I. |
|---|---|---|---|---|---|
| Dimer | 120–360 | 19.9 | | | |
| Trimer | 360–465 | 39.51 | 16.54 | 3.70 | 122 |
| Tetramer | 465–540 | 24.87 | 36.07 | 6.45 | 144 |
| Residue | | 15.09 | 88.68 | 12.91 | 153 |

The combined yield of trimer and tetramer was 64.38% of the polymer product.

EXAMPLE 12

When the ratio of nitro alkane to $AlCl_3$ is increased to 6:1, the catalyst activity is reduced to a degree that the reaction is no longer entirely exothermic and must be heated to drive it to completion. With a ratio of 6 mols $CH_3NO_2$ to 1 mol $AlCl_3$ and no $TiCl_4$, the reaction was conducted at 210–230° F. The monomer-free product tested:

Viscosity at 100° F. _____ cs__ 21.14
Viscosity at 210° F. _____ cs__ 4.44
Viscosity index _____ 134

Vacuum distillation gave the following results:

| Fraction | Yield, percent | Viscosity 100° | 210° | V.I. |
|---|---|---|---|---|
| Dimer | 41.7 | | | |
| Trimer | 38.4 | 16.38 | 3.64 | 117 |
| Residue | 19.9 | 50.4 | 7.77 | 132 |

The tetramer fraction was left in the residue. It will be seen that, although the yield and V.I. of the desired trimer fraction is good, a large amount of dimer was produced. Accordingly, for practical reasons, it appears that the ratio of nitro alkane to $AlCl_3$ in the catalyst complex should not exceed approximately 5 to 1 on a molar basis.

EXAMPLE 13

In another experiment using 1-decene similar to Experiment 1 without nitro alkane, but with $TiCl_4$, the yield of trimer was only 17.6% while the residue fraction was 54.4%. The reaction became highly exothermic at 110° F., the temperature going to 364° F. in a few seconds.

Although I have described my invention by means of specific examples, I do not intend that it be restricted thereto but only by the claims herein. The basic catalyst which I use—aluminum chloride-nitro alkane complex—was described by Schmerling (Ind. Eng. Chem., vol. 40, No. 1, p. 2072, November 1948) who studied its behavior in alkylation reactions. His work, however, failed to show the value of this catalyst in polymerization reactions and I am the first to discover the unique characteristics of the catalyst for shifting the polymerization toward the formation of lower molecular weight polymers of lower viscosity without substantial loss of viscosity index which has always accompanied such attempts previously.

In addition of the transition metal halide, $TiCl_4$, and the higher alcohol, octanol or dodecanol (lauryl alcohol) appears to promote the effect of the nitro alkane in the production of trimer and tetramer. However, my invention should not be restricted to the use of such promoters. In place of titanium chloride, I can also use silicon chloride and germanium chloride in the catalyst—generally in the ratios of ½ to 2 mols per mol of aluminum chloride.

I can also employ inert solvents such as the aliphatic hydrocarbons, hexane, heptane, etc., and the chlorinated hydrocarbons, carbon tetrachloride, trichlor ethane, etc., with boiling points below that of the polymer product to facilitate recovery. The dimer fraction of the polymer can be recycled in the process where the amount is minimal with respect to the monomer.

The olefine polymer oils produced in my invention, previously trimers and tetramers, do not have sufficient oxidation stability to meet or exceed the requirements in MIL–H–83282. It is desirable, therefore, that they be hydrogenated, preferably eliminating all olefine linkages.

Hydrogenation can be effected at pressures ranging from 500 to 2500 p.s.i. and at temperatures ranging between 250 and 500° F. The catalyst may be modified Raney nickel, palladium on charcoal, cobalt molybdate or molybdenum sulfide. The preferred catalyst is Raney nickel. Reaction times can vary between 4 to 24 hours, depending on the pressures and temperatures involved. The above-mentioned conditions are representative of those actually studied, however, they are not meant to be restrictive in any way. The following examples will illustrate the hydrogenation process.

EXAMPLE 14

The polymer oil in Example 1 was stripped of all light ends distilling below 360° F. at 0.1 mm. Hg. It was then hydrogenated using Raney nickel catalyst at 2500 p.s.i. and 400° F. for 10 hours. The hydrogenated oil was distilled and a trimer fraction (b.p. 360–470° F. at 0.1 mm.) was obtained having a viscosity at 100° F.=15.74 cs. and at 210° F.=3.59 cs., V.I.=122. The pour point of this fraction was −70° F. which is somewhat higher than the below −80° F. obtained with the unsaturated trimer fraction before hydrogenation.

EXAMPLE 15

The hydrogenated trimer of Example 14 was treated with a commercial bisphenol oxidation inhibitor and subjected to the Corrosion and Oxidation Stability Test used in MIL–L–7808G. The conditions were 72 hours at 347° F. with air flow of 5 liters per hour. Copper, aluminum, magnesium, steel and silver metals were present. The results were:

Change in weight, mg./cm.$^2$

Copper _____ 0.008
Aluminum alloy _____ −0.002
Magnesium alloy _____ −0.008
Steel _____ −0.000
Silver _____ −0.000
Viscosity increase at 100° F., percent __ 7.18
Neut. No. increase, mg. KOH/gm. _____ 0.20

These results are within the specification requirements of MIL–H–7808G, which is designed for synthetic esters and difficult to meet with hydrocarbon oils.

It is difficult to eliminate all unsaturation from the polymer oil by hydrogenation. I find that residual unsaturation can be eliminated by treatment with sulfuric acid, preferably fuming acid having 5% or more $SO_3$ content. Traces of olefine structures, e.g. 0.2 to 2%, can be more easily removed in this way than by exhaustive hydrogenation. After the acid treatment, the oil is neutralized and distilled, leaving high boiling products from the acid treatment in the residue.

I can also combine hydrogenation with extraction with a selective solvent to remove residual unsaturation. Various solvents can be used for this purpose, such as furfural, phenol, and dichlor dimethyl ether. Cyano acetol described in U.S. 3,658,904 can also be used. Following the solvent extraction, the oil can be given a final treatment with sulfuric acid as hereinabove described.

Having thus described my invention, what I claim is:

1. A process for the controlled polymerization of linear alpha olefines containing from 6 to 12 carbon atoms into polymer oils containing high percentages of trimeric and tetrameric products possessing low pour points, low viscosities, high viscosity indexes, and high flash points, said products being suitable for the formulation of light lubricating oils and hydraulic fluids, said process comprising the following steps:
   (a) reacting a linear alpha olefine of 6 to 12 carbon atoms at a temperature between 180° and 250° F., with a catalyst comprising a mixture of anhydrous aluminum chloride with a mononitroalkane having one to three carbon atoms in a ratio of 1 to 6 mols of mononitroalkane to each mol of aluminum chloride, and
   (b) removing catalyst from the polymer oil product and fractionating the oil to recover therefrom an oil fraction composed of the desired polymers of the alpha olefine starting material.
2. The process of Claim 1 wherein residual unsaturation in the polymer oil product is substantially eliminated by means of catalytic hydrogenation.
3. The process of Claim 1 wherein the recovered polymer fraction is hydrogenated after fractionation to eliminate residual unsaturation.
4. The process of Claim 1 wherein the $AlCl_3$ catalyst is further modified by the addition of 0.5 to 1.5 mols $TiCl_4$ per mole of $AlCl_3$.
5. The process of Claim 4 wherein the catalyst is further modified by the addition of a higher alcohol having 8–12 carbon atoms in an amount of 0.25 to 1 mol per mol of $AlCl_3$.
6. The process of Claim 5 wherein the higher alcohol is isodecanol.
7. The process of Claim 1 wherein the linear alpha olefine is n-decene-1.

References Cited

UNITED STATES PATENTS

| | | | |
|---|---|---|---|
| 2,142,980 | 1/1939 | Huijser et al. | 260—683.15 B |
| 2,559,984 | 7/1951 | Montgomery et al. | 260—683.15 B |
| 3,149,178 | 9/1964 | Hamilton et al. | 260—683.9 |
| 3,576,898 | 4/1971 | Blake et al. | 360—676 |
| 3,763,244 | 10/1973 | Shubkin | 260—676 |

PAUL M. COUGHLAN, Jr., Primary Examiner

U.S. Cl. X.R.

252—59; 260—683.9